United States Patent
Hu

(10) Patent No.: US 9,759,367 B2
(45) Date of Patent: Sep. 12, 2017

(54) BASE MOUNTING ASSEMBLY AND DISPLAY DEVICE

(71) Applicant: BOE TECHNOLOGY GROUP CO., LTD., Beijing (CN)

(72) Inventor: Nannan Hu, Beijing (CN)

(73) Assignee: BOE TECHNOLOGY GROUP CO., LTD. (CN)

(*) Notice: Subject to any disclaimer, the term of this patent is extended or adjusted under 35 U.S.C. 154(b) by 0 days.

(21) Appl. No.: 15/301,957

(22) PCT Filed: Dec. 23, 2015

(86) PCT No.: PCT/CN2015/098371
§ 371 (c)(1),
(2) Date: Oct. 5, 2016

(87) PCT Pub. No.: WO2017/008447
PCT Pub. Date: Jan. 19, 2017

(65) Prior Publication Data
US 2017/0175947 A1    Jun. 22, 2017

(30) Foreign Application Priority Data

Jul. 15, 2015 (CN) .................. 2015 2 0512081 U

(51) Int. Cl.
*F16M 11/00* (2006.01)
*F16M 11/04* (2006.01)
*H04N 5/64* (2006.01)

(52) U.S. Cl.
CPC .............. *F16M 11/04* (2013.01); *H04N 5/64* (2013.01)

(58) Field of Classification Search
CPC ................................. F16M 11/04; H04N 5/64
(Continued)

(56) References Cited

U.S. PATENT DOCUMENTS 2,619,308 A * 11/1952 Guestinger ............ A01K 97/10
248/126
7,733,645 B2 * 6/2010 Hsu ........................ F16M 11/08
248/188.1
(Continued)

FOREIGN PATENT DOCUMENTS

CN         2605361 Y     3/2004
CN         2812227 Y     8/2006
(Continued)

OTHER PUBLICATIONS

Written Opinion and International Search Report for International Application No. PCT/CN2015/098371, dated Apr. 21, 2016, 13 Pages.

*Primary Examiner* — Gwendolyn Baxter
(74) *Attorney, Agent, or Firm* — Brooks Kushman P.C.

(57) ABSTRACT

A base mounting assembly and a display device are provided. The base mounting assembly includes a main support on a side of a first device, a base including a pedestal part below the first device and a support post connected with the pedestal part and opposite to the main support, the support post including a first end away from the pedestal part and a second end connecting with the pedestal part, and a cushion block movably provided between the support post and the main support. A distance between the support post and the main support is gradually reduced from the first end to the second end so that when the cushion block is moved between the first end and the second end, a position of the support post relative to the main support is changed, causing a change of a position of the pedestal part relative to the first device.

11 Claims, 3 Drawing Sheets

(58) Field of Classification Search
USPC ......... 248/121, 126, 157, 158, 176.1, 177.1;
361/679.21, 679.22–679.25
See application file for complete search history.

(56) References Cited

U.S. PATENT DOCUMENTS

| | | | | |
|---|---|---|---|---|
| 2006/0208145 A1* | 9/2006 | Chen | .................... | F16M 11/046 248/289.11 |
| 2008/0023601 A1* | 1/2008 | Kuan | .................... | F16M 11/22 248/176.1 |
| 2009/0014608 A1 | 1/2009 | Yang | | |
| 2010/0193648 A1* | 8/2010 | Takao | .................... | F16M 11/22 248/163.1 |
| 2011/0073738 A1* | 3/2011 | Takao | .................... | F16M 11/10 248/397 |
| 2013/0113346 A1* | 5/2013 | Huang | ................ | F16M 11/041 312/223.1 |
| 2014/0239133 A1* | 8/2014 | Burns | .................... | F16M 11/04 248/121 |
| 2014/0321039 A1* | 10/2014 | Quijano | ................ | G06F 1/1601 361/679.22 |

FOREIGN PATENT DOCUMENTS

| | | | |
|---|---|---|---|
| CN | 103148320 A | 6/2013 | |
| CN | 104728577 A | 6/2015 | |
| CN | 204805866 U | 11/2015 | |

\* cited by examiner

BASE MOUNTING ASSEMBLY AND DISPLAY DEVICE

CROSS-REFERENCE TO RELATED APPLICATIONS

This application is the U.S. national phase of PCT Application No. PCT/CN2015/098371 filed on Dec. 23, 2015, which claims priority to Chinese Patent Application No. 201520512081.3 filed on Jul. 15, 2015, the disclosures of which are incorporated in their entirety by reference herein.

TECHNICAL FIELD

The present disclosure relates to the field of display technique, and in particular to a base mounting assembly and a display device.

BACKGROUND

Currently, sizes of televisions are becoming larger and larger. Some structural components of the televisions of large sizes cannot be produced through molds due to limitation of material specifications and processing devices, and may be produced manually. However, when the components are produced manually, it is difficult to guarantee accuracy and consistency of the components, which causes a great difficulties in assembling of the entire televisions. Further, the assembled entire televisions cannot meet relevant requirements in terms of the appearance.

In order to avoid production of assembled products that cannot meet the appearance requirements, the suppliers are required to carry out a pre-assembly before processing the appearances of the components and perform a secondary processing and manufacturing of parts that do not meet the appearance requirements to ensure that the subsequently assembled products can meet the requirements. However, even by doing so, the products that do not meet the appearance requirements still are present.

FIG. 1 is a schematic view showing a base mounting assembly of a television in the related art. As shown in FIG. 1, when mounting a base of a television in the related art, a back surface of a display 40 of the television is provided thereon with a main support 20, and the base of the television includes a pedestal 10 and a support post 30 opposite to the main support 20. The display of the television is fixed onto the support post 30 provided on the base through the main support 20, and then the display 40 of the television and the base are assembled together.

However, in the relevant art, an assembly offset between the base of the television and a front frame of the display (i.e. an offset between a front surface of the base of and a front surface of the front frame of the display) is completely guaranteed with machining precision and assembly precision. Since the components are produced manually, thus each batch of components is different. The products manufactured through the above solution can hardly meet the appearance requirements. Therefore, the components generally undergo secondary processing and second assembly, which increases costs and hours of work.

In light of the above technical problem, the base mounting assembly of the television is improved. As shown in FIG. 2, a cushion block 60 is added between the support post 30 of the base and the main support 20. The cushion block includes a series of cushion blocks having different thicknesses, and the thicknesses of the cushion blocks are changed to adjust a size b from the support post of the base to the front frame surface of the display, thereby to control the assembly offset between the front frame of the display and the base. However, as for exchanging the cushion block, it cannot be carried out until the entire base is dismantled, which increases the assembling difficulty.

SUMMARY

In order to solve the problem in the related art that it is not easy to adjust the assembly offset between the base and the displayer when mounting the base of the television, the present disclosure provides a base mounting assembly and a display device, which have simple structures and are easily operated and which can effectively reduce the production and assembly difficulties.

The technical solutions provided in the present disclosure are as follows.

A base mounting assembly for fixing a base on a first device, includes:

a main support configured to be fixed on a side surface of the first device;

a base that includes a pedestal part that is below the first device and a support post that is connected with the pedestal part and is opposite to the main support, the support post including a first end away from the pedestal part and a second end connecting with the pedestal part; and a cushion block that is movably provided between the support post and the main support;

where a distance between the support post and the main support is gradually reduced from the first end to the second end so that when the cushion block is moved between the first end and the second end, a position of the support post relative to the main support is changed, which causes a change of a position of the pedestal part relative to the first device.

Further, the support post includes a first surface facing the main support, the first surface is a pushing inclined structure or a pushing arc structure that is inclined from the first end to the second end in a direction close to the main support so that the distance between the support post and the main support is gradually reduced from the first end to the second end.

Further, the cushion block includes a second surface that contacts the first surface of the support post; the second surface is an inclined or arc structure that matches the first surface.

Further, the cushion block includes a third end away from the pedestal part and a fourth end opposite to the third end; the cushion block is of a wedge block structure with a thickness of the third end being greater than a thickness of the fourth end.

Further, the base mounting assembly further includes a limit structure that limits the cushion block when the cushion block moves to a predetermined position.

Further, the limit structure includes:

a first concave-convex structure in the cushion block; and a plurality of second concave-convex structures that are in at least one of the main support and the support post in a direction along which the cushion moves and are capable of cooperating with the first concave-convex structure.

Further, the first concave-convex structure includes a raised portion on the cushion block, the raised portion includes a first side surface close to the pedestal part and a second side surface away from the pedestal part; the second side surface is a first plane structure that is perpendicular to the side surface of the first device for fixing the main support, the first side surface is an inclined surface or an arc structure;

where the second concave-convex structure includes a groove portion in at least one of the main support and the support post, the groove portion includes a third side surface close to the pedestal part and a fourth side surface away from the pedestal part;

where the third side surface is an inclined surface or an arc structure; and the fourth side surface is a second plane structure that is perpendicular to the side surface of the first device for fixing the main support.

Further, the first concave-convex structure is a toothlike structure, and the second concave-convex structure is a tooth-groove structure that cooperates with the first concave-convex structure.

Further, the support post and the main support are fixed through a fastener.

Further, the cushion block includes an avoidance hole for avoiding the fastener, and the avoidance hole is an elongated hole that extends along the direction along which the cushion block moves.

A display device includes the above base mounting assembly. The first device is a displayer, and the main support is fixed onto a back surface of the displayer.

A display device includes a displayer with a main support; a base; and a cushion block. The base includes a pedestal part and a support post on the pedestal part; the support post faces the main support and is detachably connected with the main support. The support post has a first end away from the pedestal part and a second end connecting with the pedestal part; a distance between the support post and the main support is gradually reduced from the first end to the second end. The cushion block is clamped between the support post and the main support at such a position selected from between the first end and the second end that an assembly offset between the displayer and the base is in an acceptable range.

The acceptable range may be set according to quality requirements, so as to ensure that the assembled display device can meet the quality requirements.

The present disclosure has the following beneficial effects.

As for the base mounting assembly provided by the present disclosure, a distance between the main support and the support post thereof is in a state of gradually decreasing from one end that is away from the pedestal part of the base to one end close to the pedestal part of the base. For example, the object of adjusting assembly offset between the first device (a display) and the base can be achieved by changing the position of the cushion block between the main support and the support post of the base, i.e. the position of the first device relative to the base is changed, without dismantling the entire base to exchange cushion blocks having different thicknesses. The structure is simple, the relevant operation is easy, and the production and assembly difficulties can be effectively reduced.

DETAILED DESCRIPTION

The principle and the features of the present disclosure will be described hereinafter in conjunction with the drawings. The following embodiments are for illustrative purposes only, but shall not be used to limit the scope of the present disclosure.

Aiming at the technical problem of requiring replacing cushion blocks having different thicknesses to adjust the assembly segment difference between the base and the display when mounting the base of the display, which causes an increase in the assembling difficulty in the related art, the present disclosure provides a base mounting assembly, which has a simple structure, is easy to operate and can help to reduce production and assembly difficulty effectively.

The base mounting assembly provided by the present disclosure is configured to install a base onto a first device.

Figure 1:
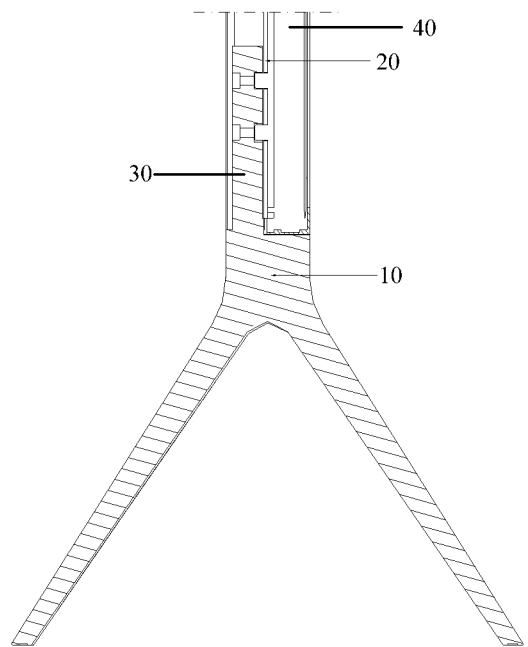
FIG. 1 is a schematic view of a base mounting assembly for a display in the related art.
Figure 2:
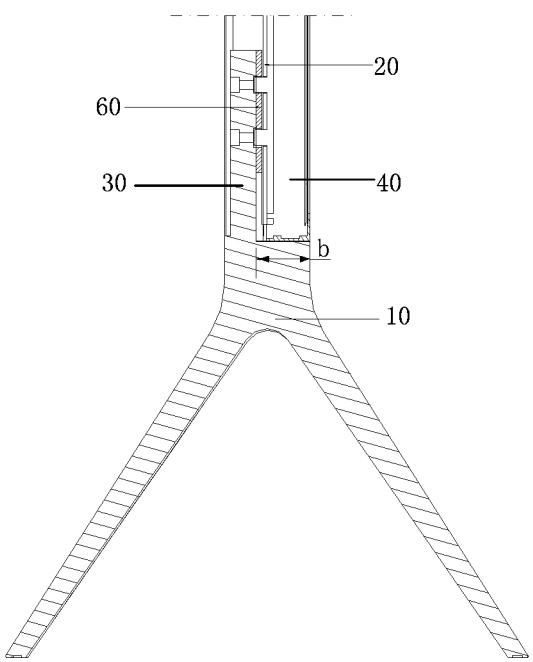
FIG. 2 is a schematic view of another base mounting assembly for a display in the related art.
Figure 3:
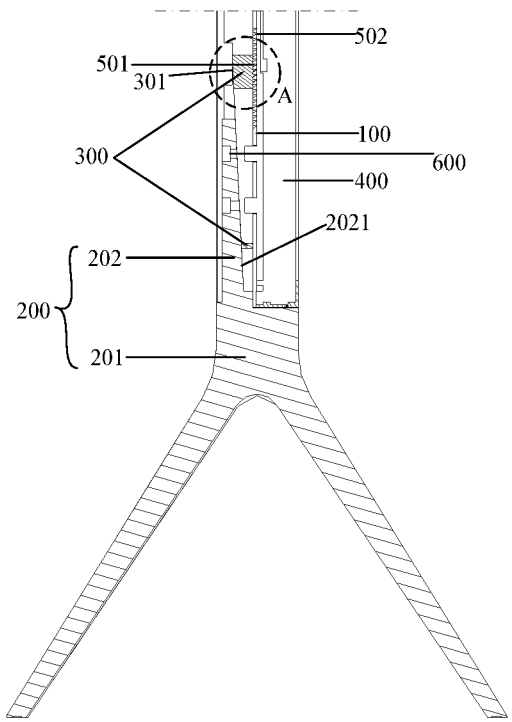
FIG. 3 is a schematic view of a base mounting assembly according to one embodiment of the present disclosure.

As shown in FIG. 3, the base mounting assembly provided by the present disclosure includes:

a main support 100 fixed on a side surface of the first device;

a base 200 that includes a pedestal part 201 that is below the first device and a support post 202 that is connected with the pedestal part 201 and is opposite to the main support 100, the support post 202 including a first end away from the pedestal part 201 and a second end connecting with the pedestal part 201; and a cushion block 300 that is movably provided between the support post 202 and the main support 100.

A distance between the support post 202 and the main support 100 is gradually reduced from the first end to the second end so that when the cushion block 300 is moved between the first end and the second end, a position of the support post 202 relative to the main support 100 is changed, which causes a change of a position of the pedestal part 201 relative to the first device.

As for the base mounting assembly of the present disclosure, the distance between the support post 202 and the main support 100 is in a state of being gradually reduced from one end of the pedestal part 201 away from the base 200 to one end of the pedestal part 201 close to the base 200. In such a way, an object of adjusting assembly segment difference between the first device (such as a display) and the base 200 can be achieved by changing a position of the cushion block 300 between the main support 100 and the support post 202 of the base 200, i.e. the position of the first device relative to the base 200 is changed, without dismantling the entire base 200 to exchange cushion blocks 300 having different thicknesses. The structure is simple, the operation is easy and the production and assembly difficulty can be effectively reduced.

The optional embodiments of the base mounting assembly provided by the present disclosure are explained as follows. Prior to explaining the base mounting assembly provided in optional embodiments of the present disclosure, it is necessary to clarify the technical field in which the base mounting assembly provided by the present disclosure is applied.

The base mounting assembly provided by the present disclosure can be configured to mount the base 200 on the first device. The first device can be various devices requiring to be provided with the base 200. In embodiments of the present disclosure, the optional embodiments of the present disclosure are explained by taking the first device being a displayer as an example, which facilitates explaining the present disclosure more clearly.

As shown in FIGS. 3 to 6, in one embodiment, the base mounting assembly includes:

a main support 100 configured to be fixed on a back surface of a displayer 400;

a base 200 that includes a pedestal part 201 that is below the displayer 400 and a support post 202 that is connected with the pedestal part 201 and is opposite to the main support 100, the support post 202 including a first end 201 away from the pedestal part 201 and a second end connecting with the pedestal part 201; and a cushion block 300 that is movably provided between the support post 202 and the main support 100.

A distance between the support post 202 and the main support 100 is gradually reduced from the first end to the second end so that when the cushion block 300 is moved between the first end and the second end of the support post 202, a position of the support post 202 relative to the main support 100 is changed, which causes a change of a position of the pedestal part 201 relative to the displayer 400.

In the above solution, the distance between the support post 202 and the main support 100 is in a state of being gradually reduced from the first end to the second end. In such a way, when the cushion block 300 provided between the support post 202 and the main support 100 moves from a position close to the first end of the support post 202 to a position close to the second end of the support post 202, the support post 202 is pushed to shift to a direction away from a display screen relative to the displayer 400 so as to enable a front side surface of the pedestal part 201 of the base 200 to be shifted backwards relative to the displayer 400. When the cushion block 300 moves from the position close to the second end of the support post 202 to the position close to the first end of the support post 202, the support post 202 can be shifted towards a direction close to the displayer 400 relative to the displayer 400 so as to enable the front side surface of the pedestal part 201 of the base 200 to be shifted forward relative to the displayer 400 to adjust the segment difference between the base 200 and the displayer 400. During the whole process of adjusting the segment difference, the segment difference adjustment can be made only by releasing a fastener between the support post 202 and the main support 100 and adjusting the position of the cushion block 300 without dismantling the cushion block 300. The above operation is easy. Therefore, the machining precision of the displayer 400 and the base 200 can be effectively reduced, and the assembly difficulty is also reduced.

In one embodiment, optionally, as shown in FIG. 3, the support post 202 includes a first surface 2021 facing the main support 100. The first surface 2021 is a pushing inclined structure that is gradually inclined from the first end to the second end in a direction close to the main support 100 so that the distance between the support post 202 and the main support 100 is gradually reduced from the first end to the second end.

By adopting the above solution, the distance between the support post 202 and the main support 100 is gradually reduced from the first end to the second end by designing the first surface 2021 of the support post 202 that faces the main support 100 to be one pushing inclined surface structure. The structure is simple, and is easy to be operated.

It should be understood that, in other embodiments of the present disclosure, the first surface 2021 of the support post 202 may also be designed to be a pushing arc surface structure.

In addition, in other embodiments of the present disclosure, other manners may be used to gradually reduce the distance between the support post 202 and the main support 100 from the first end to the second end. For example, the main support 100 includes a third surface facing the support post 202. The third surface is a pushing inclined structure or a pushing arc surface structure that is gradually inclined toward the direction close to the support post 202 from the first end to the second end so that the distance between the support post 202 and the main support 100 is gradually reduced from the first end to the second end.

In this embodiment, optionally, as shown in FIG. 3, when the first surface 2021 of the support post 202 is a pushing inclined structure, the cushion block 300 includes a second surface 301 that contacts the first surface 2021 of the support post 202, and the second surface 301 is an inclined surface structure matching the first surface 2021.

By adopting the above technical solution, the cushion block 300 can closely cooperate with the support 202 by designing the second surface 301 of the cushion block 300 to be an inclined surface structure cooperating with the pushing inclined surface structure on the support post 202, and the cushion block 300 more easily pushes the support post 202 of the base 200 by means of cooperation between inclined surfaces. The relevant operation is easy.

It should be noted that, in other embodiments of the present disclosure, when the third surface of the main support 100 is a pushing inclined surface structure, a fourth surface on the cushion block 300 that is opposite to the first surface 2021 is an inclined surface structure matching the structure of the third surface correspondingly.

It should be further noted that, in other embodiments of the present disclosure, when the first surface 2021 of the support 202 is a pushing arc surface structure, the second surface 301 of the cushion block 300 is an arc surface structure matching the structure of the first surface 2021 so that the support post 202 and the cushion block 300 can cooperate closely, completely fit each other, and have a reliable structure.

Figure 4:
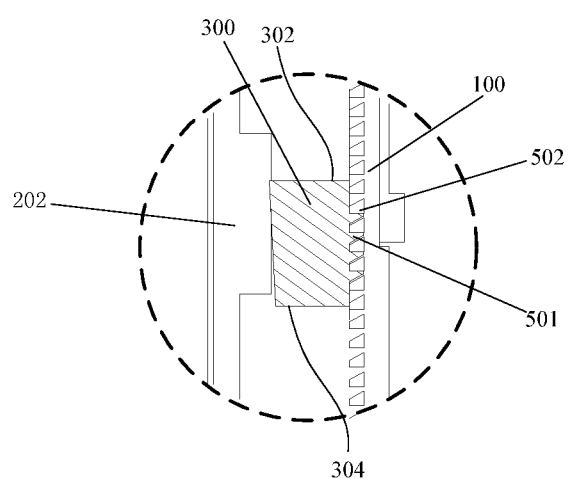
FIG. 4 is an enlarged view of a portion in a circle A shown in FIG. 3.

In addition, in one embodiment, optionally, as shown in FIG. 4, the cushion block 300 includes a third end 302 away from the pedestal part 201 and a fourth end 303 opposite to the third end 302. The cushion block 300 has a wedge block structure in which a thickness of the third end 302 is greater than a thickness of the fourth end 303.

By adopting the above technical solution, the cushion block 300 is designed to be the wedge block structure, and the structure may completely match a spatial structure between the support post 202 and the main support 100. When the cushion block 300 moves to an arbitrary position, it can closely cooperate with the support post 202 and the main support 100 provided at two sides of the cushion block. They fit each other and have a reliable structure.

In addition, in one embodiment, optionally, the base mounting assembly further includes a limit structure that limits the cushion block 300 after the cushion block 300 moves to a predetermined position. By providing the limit structure, when the cushion block 300 is moved to a suitable position, the cushion block 300 is limited and fixed so as to prevent an accidental slipping of the cushion block 300.

Figure 5:
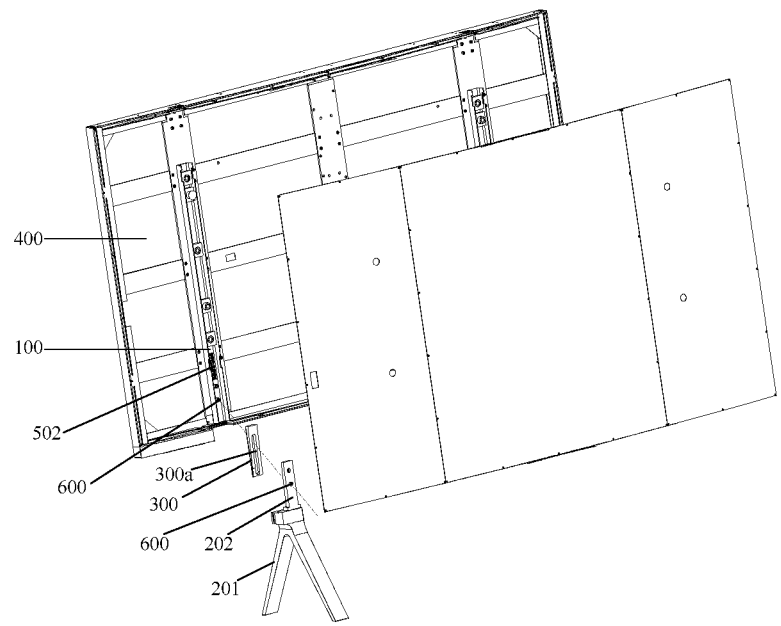
FIG. 5 is an exploded view of the base mounting assembly when assembling with a display according to one embodiment of the present disclosure.

In one embodiment, optionally, as shown in FIGS. 3 to 5, the limit structure includes:

a first concave-convex structure 501 provided on the cushion block 300; and a plurality of second concave-convex structures 502 that are provided on the main support 100 in a direction in which the cushion block 300 moves and are capable of cooperating with the first concave-convex structure 501.

When adopting the above technical solution, by providing the first concave-convex structure 501 on the cushion block 300 and providing the second concave-convex structure 502 on the main support 100, when the cushion block 300 moves to a suitable position, the first concave-convex structure 501 on the cushion block 300 can cooperate with the second concave-convex structure 502 at this position of the main support 100 so as to fix and limit the cushion block. When the concave-convex structures cooperate to fix and limit the cushion block 300, the structure is simple. It should be understood that, during actual uses, the limit structure also may be realized in other manners. For example, the limit structure may be realized by cooperating a pin with a pin hole. The specific structure of the limit structure is not enumerated here.

Further, optionally, as shown in FIG. 4, the first concave-convex structure 501 is a toothlike structure, and the second concave-convex structure 502 is a tooth-groove structure that cooperates with the first concave-convex structure 501.

By adopting the above technical solution, the toothlike structure and the tooth-groove structure have relatively small sizes, and are distributed relatively densely. When the cushion block 300 is moved, it can be limited at an arbitrarily suitable position.

It should be understood that, during actual uses, the specific structures of the first concave-convex structure 501 and the second concave-convex structure 502 are not limited to a cooperation of the toothlike structure and the tooth-groove structure, and they may be concave-convex structures in other shapes. For example, the first concave-convex structure 501 may be a strip-type convex edge, and the plurality of second concave-convex structure 502 may be plurality of strip-type grooves provided in a direction in which the cushion block 300 is moved.

In addition, in one embodiment, optionally, as shown in FIG. 4, the first concave-convex structure 501 includes a raised portion provided on the cushion block 300. The raised portion includes a first side surface close to the pedestal part 201 and a second side surface away from the pedestal part. The second side surface is a first plane structure that is perpendicular to the back surface of the displayer 400. The first side surface is an inclined or arc surface structure.

The second concave-convex structure 502 includes a groove portion provided in at least one of the main support 100 and the support post 202. The groove portion includes a third side surface close to the pedestal part 201 and a fourth side surface away from the pedestal part. The third side surface is an inclined or arc surface structure, and the fourth side surface is a second plane structure that is perpendicular to the back surface of the displayer 400.

By adopting the above technical solution, the distance between the support post 202 and the main support 100 is gradually reduced from the first end to the second end of the support post 202. Therefore, when the cushion block 300 slides downward, i.e. the cushion block 300 slides in a direction close to the pedestal part 201, since the more downward the cushion block 300 slides the smaller the space is, thus the cushion block 300 is easily squeezed by the main support 100 and the support post 202 to slide up. Therefore, in the above technical solution, an object of preventing the cushion block 300 from sliding upward can be achieved by designing the second side surface (i.e., upper side surface) of the first concave-convex structure 501 and the fourth side surface (i.e., upper side surface) of the second concave-convex structure 502 to be horizontal planes.

Besides, in one embodiment, optionally, as shown in FIGS. 3 and 5, screw holes 600 may be provided in the support post 202 and the main support 100, respectively. The support post 202 and the main support 100 are fixed by installing fasteners into the screw holes 600.

In this technical solution, the base 200 is mounted on the displayer 400 by installing the fastener into the support post 202 and the main support 100, and this fastener may be a fastening bolt. In this way, the fastener may be released so that the cushion block 300 is moved to a suitable position. After the cushion block 300 is moved to the suitable position, it merely needs to fix the support post 202 and the main support 100 together through the fastener. During the whole process, it does not need to dismantle the base 200, and the relevant operation is easy.

Figure 6:
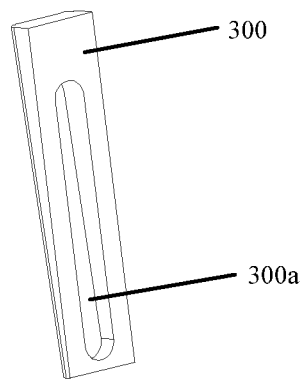
FIG. 6 is an exploded view of a cushion block of the base mounting assembly according to one embodiment of the present disclosure.

Further, optionally, as shown in FIGS. 5 and 6, the cushion block 300 is provided thereon with an avoidance hole 300a. The avoidance hole 300a is an elongated hole that extends along the direction in which the cushion block 300 moves. The fastener can be avoided by providing the elongated hole for avoiding the fastener in the cushion block 300.

In addition, the embodiments of the present disclosure further provide a display device, which includes the displayer 400 and the base mounting assembly provided in the embodiments of the present disclosure. The main support 100 in the base mounting assembly is fixed at a back surface of the displayer 400, and the pedestal part 201 is provided below the displayer 400.

The above are merely the optional embodiments of the present disclosure. It should be noted that, a person skilled in the art may make further modifications and improvements without departing from the principle of the present disclosure, and these modifications and improvements shall also fall within the scope of the present disclosure.

What is claimed is:

1. A base mounting assembly for fixing a base on a first device, comprising:

a main support configured to be fixed on a side surface of the first device;

a base that comprises a pedestal part that is below the first device and a support post that is connected with the pedestal part and is opposite to the main support, the support post including a first end away from the pedestal part and a second end connecting with the pedestal part; and a cushion block that is movably provided between the support post and the main support;

wherein a distance between the support post and the main support is gradually reduced from the first end to the second end so that when the cushion block is moved between the first end and the second end, a position of the support post relative to the main support is changed, which causes a change of a position of the pedestal part relative to the first device.

2. The base mounting assembly according to claim 1, wherein the support post comprises a first surface facing the main support, the first surface is a pushing inclined structure or a pushing arc structure that is inclined from the first end to the second end in a direction close to the main support so that the distance between the support post and the main support is gradually reduced from the first end to the second end.

3. The base mounting assembly according to claim 2, wherein the cushion block comprises a second surface that contacts the first surface of the support post; the second surface is an inclined or arc structure that matches the first surface.

4. The base mounting assembly according to claim 1, wherein the cushion block comprises a third end away from the pedestal part and a fourth end opposite to the third end; the cushion block is of a wedge block structure with a thickness of the third end being greater than a thickness of the fourth end.

5. The base mounting assembly according to claim 1, further comprising a limit structure that limits the cushion block when the cushion block moves to a predetermined position.

6. The base mounting assembly according to claim 5, wherein the limit structure comprises:
a first concave-convex structure in the cushion block; and
a plurality of second concave-convex structures that are in at least one of the main support and the support post in a direction along which the cushion moves and are capable of cooperating with the first concave-convex structure.

7. The base mounting assembly according to claim 6, wherein the first concave-convex structure comprises a raised portion on the cushion block, the raised portion comprises a first side surface close to the pedestal part and a second side surface away from the pedestal part; the second side surface is a first plane structure that is perpendicular to the side surface of the first device for fixing the main support, the first side surface is an inclined surface or an arc structure;
wherein the second concave-convex structure comprises a groove portion in at least one of the main support and the support post, the groove portion comprises a third side surface close to the pedestal part and a fourth side surface away from the pedestal part;
wherein the third side surface is an inclined surface or an arc structure; and the fourth side surface is a second plane structure that is perpendicular to the side surface of the first device for fixing the main support.

8. The base mounting assembly according to claim 6, wherein the first concave-convex structure is a tooth structure, and the second concave-convex structure is a tooth-groove structure that cooperates with the first concave-convex structure.

9. The base mounting assembly according to claim 1, wherein the support post and the main support are fixed through a fastener.

10. The base mounting assembly according to claim 9, wherein the cushion block comprises an avoidance hole for avoiding the fastener, and the avoidance hole is an elongated hole that extends along the direction along which the cushion block moves.

11. A display device, comprising: the base mounting assembly according to claim 1;
wherein the first device is a displayer, and the main support is fixed onto a back surface of the displayer.

* * * * *